Figure 1:
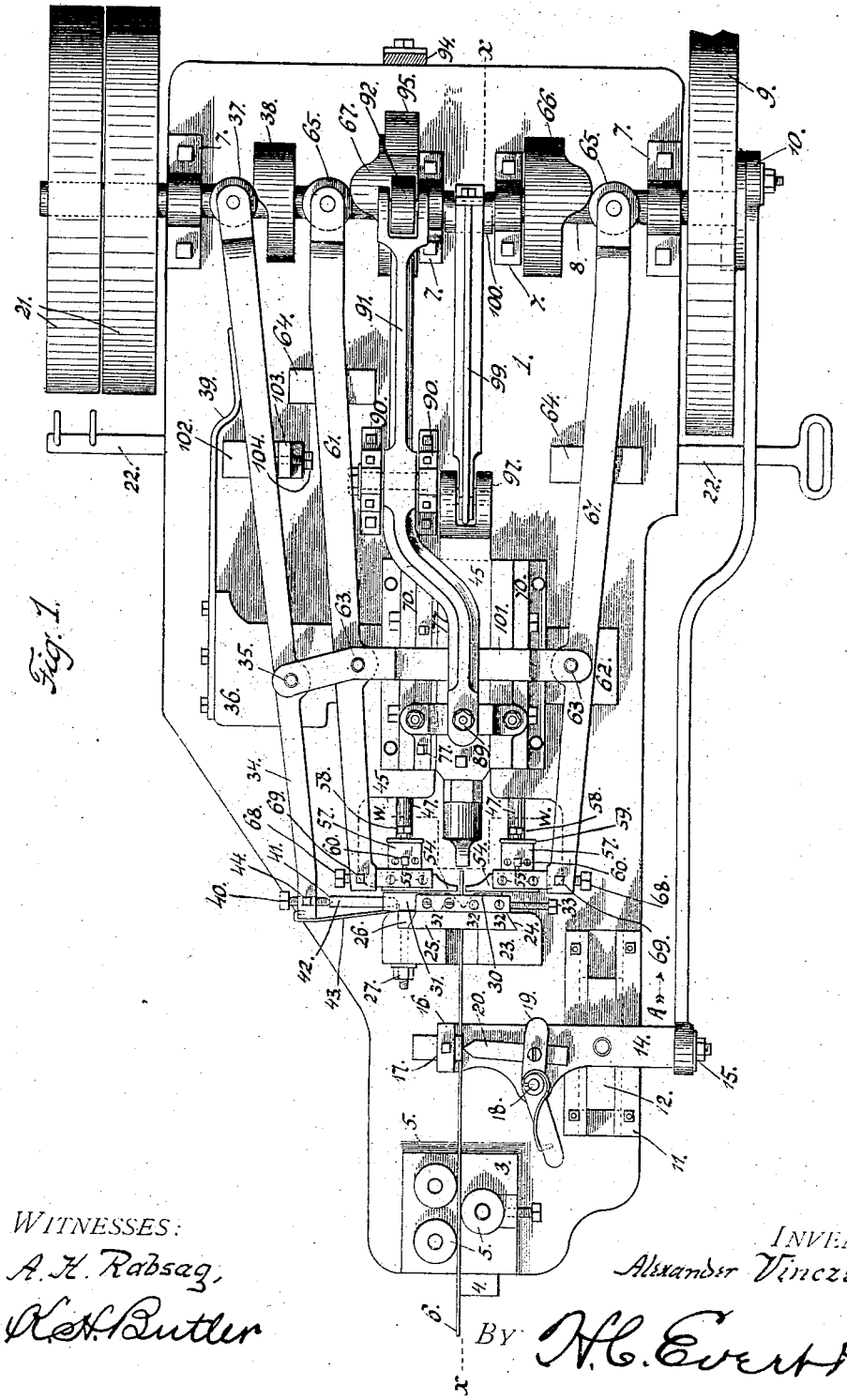

No. 879,702. PATENTED FEB. 18, 1908.
A. VINCZE.
NAIL MAKING MACHINE.
APPLICATION FILED JUNE 19, 1907.

3 SHEETS—SHEET 1.

WITNESSES:
A. H. Rabsag,
K. H. Butler

INVENTOR
Alexander Vincze
BY H. C. Evert & Co.
Attorneys

No. 879,702. PATENTED FEB. 18, 1908.
A. VINCZE.
NAIL MAKING MACHINE.
APPLICATION FILED JUNE 19, 1907.
3 SHEETS—SHEET 2.
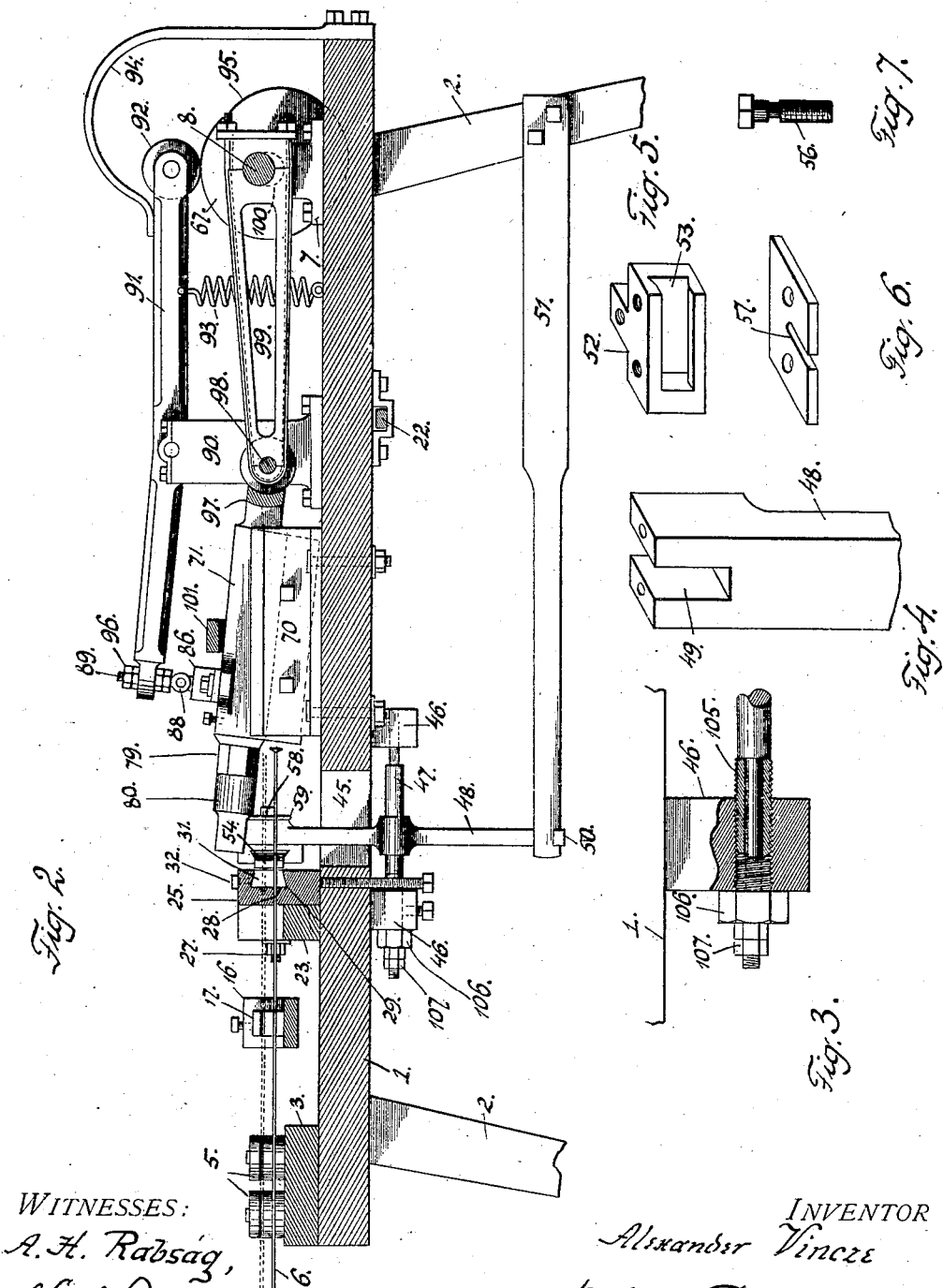
WITNESSES:
A. H. Rabság,
INVENTOR
Alexander Vincze
BY
Attorneys No. 879,702.
A. VINCZE.
NAIL MAKING MACHINE.
APPLICATION FILED JUNE 19, 1907.
PATENTED FEB. 18, 1908.
3 SHEETS—SHEET 3.
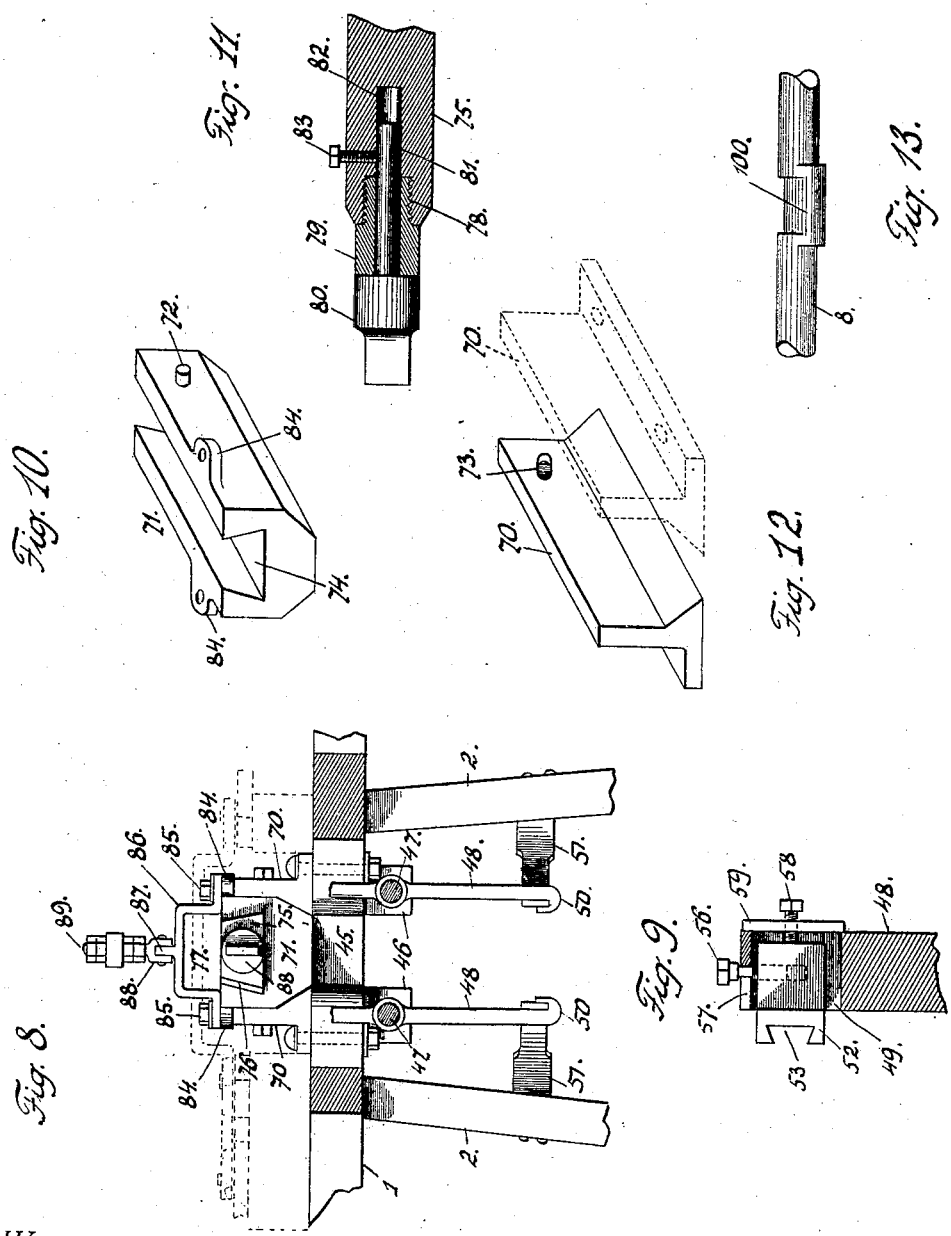
WITNESSES:
A. H. Rabság,
K. H. Butler
INVENTOR
Alexander Vincze
BY H. C. Evert & Co.
Attorneys

UNITED STATES PATENT OFFICE.

ALEXANDER VINCZE, OF RANKIN, PENNSYLVANIA.

NAIL-MAKING MACHINE.

No. 879,702.  Specification of Letters Patent.  Patented Feb. 18, 1908.

Application filed June 19, 1907. Serial No. 379,753.

*To all whom it may concern:*

Be it known that I, ALEXANDER VINCZE, a citizen of the United States of America, residing at Rankin, in the county of Allegheny and State of Pennsylvania, have invented certain new and useful Improvements in Nail-Making Machines, of which the following is a specification, reference being had therein to the accompanying drawing.

This invention relates to improvements in nail making machines, and the invention has for its primary object to provide a novel machine wherein the heading of a nail is accomplished by pressure instead of a blow, thereby dispensing with the deafening or obstreperous noise heretofore encountered in nail making plants or mills.

Another object of this invention is to provide a machine that can be easily adjusted for producing nails of various lengths and sizes.

A further object of this invention is to provide a machine wherein the dangerous revolving elements of the machine are located as to not endanger the life of the operator or attendant of the machine.

With the above and other objects in view, which will more readily appear as the invention is better understood, the same consists in the novel construction, combination and arrangement of parts to be presently described, and then specifically pointed out in the appended claims.

Referring to the drawings forming a part of this specification, like numerals of reference designate corresponding parts throughout the several views, in which, Figure 1 is a plan of the machine. Fig. 2 is a longitudinal sectional view of the machine, taken on the line x—x of Fig. 1. Fig. 3 is a detailed sectional view of an adjustment used in connection with the gripping arms of the machine. Fig. 4 is a perspective view of the upper end of one of said gripping arms. Fig. 5 is a similar view of an adjustable gripping block holder. Fig. 6 is a similar view of a plate carried by a gripping arm. Fig. 7 is an elevation of a screw for adjusting a gripping block holder. Fig. 8 is a cross sectional view of the machine taken on the line w—w of Fig. 1, illustrating a part of the machine in dotted lines. Fig. 9 is a detailed sectional view, illustrating the adjustment of a gripping block holder, as carried by the end of a gripping arm. Fig. 10 is a perspective view of a header block holder. Fig. 11 is a longitudinal sectional view of a portion of a header block, illustrating the header thereof in elevation. Fig. 12 is a perspective view of the header block holder housing, illustrating a portion of the same in dotted lines. Fig. 13 is an elevation of a portion of the main operating shaft.

To put my invention into practice, I construct the machine of a bed plate 1 supported by suitable legs or standards 2. At the forward end of the bed plate 1 is formed a bearing plate 3 and a guide post 4. Upon the bearing plate 3 are journaled grooved guide rollers 5 for guiding a piece of wire 6 into the machine.

Arranged transversely of the bed plate 1, at the rear end thereof, are bearings 7 for a main operating shaft 8, the ends of said shaft protruding from the side edges of the bed plate 1. One end of the shaft 8 is provided with a large balance wheel 9 and eccentrically connected to said wheel is an adjustable pitman 10, said pitman actuating the feeding mechanism of the machine.

At the forward side of the bed plate 1 is located a longitudinally disposed guide bearing 11 for a block 12 carrying a transverse arm 14, to the outer end of which is connected the adjustable pitman 10, as at 15. The arm 14 extends inwardly and is bent upwardly, as at 16, and provided with an adjustable gripping block 17 alining longitudinally with the pass of the guide rollers 5. Pivotally mounted upon the arm 14, as at 18, is a spring pressed lever 19 carrying an adjustable gripping bit 20 adapted to impinge the wire 6 and retain the same in engagement with the gripping block 17, while the arm 14 is being moved in the direction of the arrow A of Fig. 1. This is accomplished by the lever 19 being pivotally mounted off the longitudinal axis of the arm 14, the lever 19 and the bit 20 having a wedging action while the arm 14 is moving in the direction of the arrow, said lever and bit receding while the arm 14 is moved in the opposite direction to take a fresh grip upon the wire 6 and feed another portion of the same forward. The shaft 8 at the opposite side of the machine is provided with belt wheels 21, while slidably mounted under bed plate 1 is a belt shifter 22 adapted to be actuated by an operator or attendant upon the right hand side of the machine.

Upon the bed plate 1 in longitudinal alinement with the bearing plate 3 and the inner end of the arm 14 is a grooved bearing block 23, having a vertically disposed dovetail groove 24 for a block 25, said block being retained therein by a wedge 26 held in position by a screw-bolt 27. The block 25 is provided with an opening 28 to permit of the wire 6 passing therethrough. In the block 25 is formed a transverse dove-tail groove 29 for a stationary shearing block 30 and a movable shearing block 31. These blocks are vertically adjusted by set screws 32, while the block 30 is transversely adjusted by a set screw 33. The movable shearing block 31 is actuated through the medium of an arm 34, pivotally mounted, as at 35, upon a bearing block 36, carried by the bed plate 1. The rear end of the arm 34 is provided with a roller bearing 37 normally held in engagement with a cam 38 by a spring 39, carried by the bearing block 36. The cam 38 is fixed upon the shaft 8. The forward end of the arm 34 is provided with a set screw 40 having a tapering end 41 entering a rod 42, which engages in the shearing block 31. The rod 42 is held in engagement with the end screw 40 by a spring 43, carried by the end of the arm 34 and engaging the end of the rod 42 seated in the shearing block 31. Since the arm 34 is oscillated by the cam 38 and the forward end of said arm describes an arc, it is necessary that the rod 42 be used to impart a movement to the shearing block 31, as this block is only capable of moving transversely in the groove 29 of a block 25. The set screw 40 is locked by a set screw 44.

The bed plate 1 is provided with a T shaped opening 45, and carried by the bed plate 1 are hangers 46 arranged at the sides of said openings. In said hangers are longitudinally disposed rock shafts 47, carrying vertically disposed arms 48 having their upper ends bifurcated, as at 49, while their lower ends are hook-shaped, as at 50, and engaged by leaf springs 51 secured to the rear legs or supports 2 of the machine.

In the upper bifurcated ends of the rock arms 48 are located gripping block holders 52, said holders having transverse dovetail grooves 53 formed therein for gripping blocks 54, said blocks being adjusted by set screws 55. The gripping block holders are vertically disposed through the medium of set screws 56 slidably mounted in slotted plates 57 secured upon the upper bifurcated ends 49 of the rocking arms 48. Horizontal adjustment of the gripping block holders is accomplished through the medium of set screws 58, carried by plates 59 secured to the upper ends of the rock arms 48. The gripping blocks 54 can be horizontally adjusted by set screws 60, when the set screws 55 are loosened. The arms 48 are rocked by virtue of levers 61 pivotally mounted upon the bearing block 36 and a bearing block 62, as at 63, the rear ends of said arms being supported by bearings 64 and provided with roller bearings 65 for engaging cams 66 and 67, carried by the shaft 8. The forward ends of the levers 61 contact with the outer ends of the holders 52, and the stroke of the gripping block 54 is governed by set screws 68, carried by the forward ends of the levers 61, said set screws being locked by screws 69. The gripping blocks 54 are adapted to grip the wire 6 and temporarily hold the same while being headed or operated upon by the head block and its header.

Secured to the bed plate 1 upon each side of the longitudinal portion of the opening 45 of said bed plate, are housings 70 for a movable header block holder 71, said holder being provided with diametrically opposed trunnions or pins 72 adapted to engage in incline slots 73 formed in the confronting faces of the housing 70. The holder 71 is provided with a dove-tail groove 74 for a head block 75, said block being retained in the holder 71 by a key 76 and angularly disposed set-screws 77. The block 75 is provided with a threaded socket 78 for a nut 79, and carried by said nut is a header 80 having a shank 81 extending rearwardly into the bore 82 of the head block 75, where it is secured by a set screw 83. The holder 71 carries outwardly extending pierced lugs 84 overlying the upper edges of the housing 70. Connected to said lugs, as at 85, is a strap 86 having a central pierced lug 87, to which is pivotally connected the bifurcated end 88 of a pin 89.

Mounted upon the bed plate 1 in alinement with one of the housings 70 and to one side of the longitudinal axis of the machine, are bearings 90 and fulcrumed between said bearings is a beam 91 carrying at its rear end a roller 92 normally held in engagement with the cam 67 by springs 93 and 94, the former being a coiled spring arranged between the bed plate 1 and the beam 91, while the latter is secured to the rear end of the bed plate and extends upwardly over the shaft 8 and engages the upper edge of the beam 91. The cam 67 is provided with a peripheral enlargement 95 for elevating the rear end of the beam 91. The forward end of the beam is connected by nuts 96 to the pin 89. The actuating mechanism just described is for raising and lowering the holder 71 in the housing 70. To move the header longitudinally, I provide the rear end of the head block 75 with pierced lugs 97, and pivotally mounted between said lugs, as at 98, is a crank frame 99, carried by the cranked portion 100 of the shaft 8.

The reference numeral 101 designates a strap connecting the pivot points 63 of the lever 61 and the pivot point 35 of the arm 34. In connection with the arm 34, I use a bearing block 102 and post 103 and a screw 104 for governing the oscillation of said arm.

In order that nails of different lengths can be made, it is necessary that I use the adjustment illustrated in Figs. 2 and 3 of the drawings for the rock shafts 47. The adjustment consists in mounting one end of each rock shaft in a threaded sleeve 105 normally locked in engagement with the hanger 46 by a nut 106 and lock nuts 107.

Operation: To place the machine in operation, it is necessary to carry the end of a piece of wire through the pass of the rollers 5, pass the gripping block 17, through the opening 28 of the block 25 and between the shearing blocks 30 and 31 and the gripping blocks 54, it being understood that the wire 6 feeds from a reel or a suitable supply of wire. When the machine is placed in operation, the cams 66 and 67 actuate the levers 61, causing the gripping blocks 54 to grasp the end of the wire 6. While this operation is taking place, the peripheral enlargement 95 of the cam 67 is actuating the beam 91 to lower the header block holder 71 in the housing 70, and place the header 80 in direct alinement with the end of the wire 6. This is accomplished by lowering the forward end of the holder 71 and elevating the rear end, said rear end being elevated by the trunnions or pins 72 traveling in the grooves 73. Immediately upon the header 80 alining with the end of the wire 6, the cranked portion 100 of the shaft 8 moves the head block 75 forward in the holder 71, causing the header 80 to impinge the wire 6, up set the metal and form a head, this being accomplished by the pressure brought to bear by said header. During this operation the gripping blocks 54 firmly hold the piece of wire and immediately upon the header assuming its normal position, which is accomplished by virtue of the beam 91 and springs 93 and 94, the levers 61 are released by the cams 66 and 67 and the springs 51, beneath the bed plate 1, rocks the arms 48 and releases the gripping blocks carried thereby. The beam 10 is now actuated for moving the arm 14 forward carrying with it the piece of wire 6. The wire is moved inwardly a desired distance, according to the length of the nail, and the opposite stroke of the pitman 10 carries the arm 14 outward in position to take a fresh grip upon the piece of wire. During this operation, the arm 34 is actuated by the cam 38 and through the medium of the movable shearing block 31, the piece of wire 6 is cut, the shape of the confronting edges of the shearing blocks 30 and 31 producing a point upon the finished product, which drops through the opening 45 into a suitable receptacle located beneath the machine for collecting the nails. The numerous adjustments used in connection with the gripping blocks 54 permits of nails of various lengths, diameters and different heads being formed, it being necessary that the machine be universal for producing various kinds of nails.

I desire to call particular attention to the fact that the head of the nail is accomplished by pressure instead of a sharp delivered blow, while the steps in the production of a nail are either simultaneous or so closely associated as to successively, as well as successfully, produce nails.

It is thought the operation and construction of the machine will be fully understood in the foregoing description and illustration, and I desire to be understood that such changes in the minor details of construction, as are permissible by the appended claims, can be resorted to, without departing from the spirit and scope of the invention.

Having fully described my invention, what I claim and desire to secure by Letters Patent is:

1. A nail making machine comprising the combination with a bed plate, of an operating shaft journaled thereon, housings carried by the bed plate, a header block holder movably-mounted in said housings, a beam pivoted upon the bed plate and actuated by said operating shaft for moving said holder, a header block movably-mounted in said holder and reciprocated by said operating shaft, and a header carried by said block.

2. A nail making machine comprising the combination with a bed plate, of an operating shaft journaled thereon, a housing mounted upon the bed plate and formed with inclined slots, a holder mounted in the housing and provided with pins engaging in said slots, a reciprocatory header block slidably-connected to said holder, a header secured to said block, means upon said shaft and connected with the holder for elevating it and said header block, and means operated from said shaft for reciprocating said header block.

3. A wire nail making machine comprising the combination with a bed plate, of an operating shaft journaled thereon, a housing mounted upon the bed plate and formed with inclined slots, a holder mounted therein and provided with pins engaging said slots, a reciprocatory header block slidably connected to said holder, a header secured to said block, a beam having its forward end pivotally-connected to said holder and adapted when operated to elevate the holder, means carried by said shaft and engaging with said beam for operating it, and means connected with the header block and with the shaft for reciprocating said block.

4. A nail making machine comprising a housing, a header block holder mounted within and engaging the housing, a header block slidably-mounted in said holder, a header carried by said block, an operating device, a pivoted beam engaging with said holder for elevating it, means carried by the shaft and engaging with the beam for actuating it, and means connected with the shaft and with said block for reciprocating the latter.

In testimony whereof I affix my signature in the presence of two witnesses.

ALEXANDER VINCZE.

Witnesses:
A. H. RABSAY,
MAX H. SROLOVITZ.